(12) United States Patent
Alexis

(10) Patent No.: US 7,395,342 B2
(45) Date of Patent: *Jul. 1, 2008

(54) PRE-EXECUTION ENVIRONMENT COMPLIANT DYNAMIC HOST CONFIGURATION PROTOCOL RELAY AGENT

(75) Inventor: Alan Previn Alexis, Selangor (MY)

(73) Assignee: Intel Corporation, Santa Clara, CA (US)

( * ) Notice: Subject to any disclaimer, the term of this patent is extended or adjusted under 35 U.S.C. 154(b) by 291 days.

This patent is subject to a terminal disclaimer.

(21) Appl. No.: 11/339,225

(22) Filed: Jan. 25, 2006

(65) Prior Publication Data

US 2006/0168280 A1    Jul. 27, 2006

Related U.S. Application Data

(63) Continuation of application No. 10/108,019, filed on Mar. 27, 2002, now Pat. No. 7,024,484.

(51) Int. Cl.
G06F 15/16    (2006.01)

(52) U.S. Cl. ................... 709/229; 709/218; 709/222; 709/223

(58) Field of Classification Search .............. 709/229
See application file for complete search history.

(56) References Cited

U.S. PATENT DOCUMENTS

2002/0161868 A1  10/2002  Paul et al. ............... 709/221
2002/0161995 A1  10/2002  French et al. ............ 713/2
2002/0178289 A1  11/2002  Kurose .................... 709/245
2002/0198972 A1  12/2002  Babbitt et al. ........... 709/222
2003/0014621 A1   1/2003  French et al. ............ 713/2

OTHER PUBLICATIONS

Intel Corporation, "Preboot Execution Environment (PXE) Specification," Version 2.1, Sep. 20, 1999.
R. Droms, "Dynamic Host Configuration Protocol," Network Working Group/Request for Comments, Mar. 1997, pp. 1-41.

Primary Examiner—Jason Cardone
Assistant Examiner—Nicholas Taylor
(74) Attorney, Agent, or Firm—Pillsbury Winthrop Shaw Pittman LLP

(57) ABSTRACT

A pre-boot server address relay device relays packets from the diskless computing device to an address allocation server to discover available network addresses. The pre-boot server address relay device receives offer packets from the address allocation server offering a network address and generates modified packets by modifying each of the offer packets from the address allocation server. The modified packets are transmitted to the diskless computing device. The pre-boot server address relay device relays request packets from the diskless computing device to the address allocation server. The pre-boot server address relay device receives acknowledgment packets from the address allocation server acknowledging the request of the network address and generates modified acknowledgement packets by modifying the acknowledgment packets from the address allocation server. The pre-boot server address relay device transmits the modified acknowledgement packets to the diskless computing device to enable remote booting.

18 Claims, 5 Drawing Sheets

PRE-EXECUTION ENVIRONMENT COMPLIANT DYNAMIC HOST CONFIGURATION PROTOCOL RELAY AGENT

RELATED APPLICATIONS

This application is a continuation of U.S. patent application Ser. No. 10/108,019, filed Mar. 27, 2002, now U.S. Pat. No. 7,024,484.

BACKGROUND OF THE INVENTION

1. Field of the Invention

The present invention generally relates to remote booting of a diskless computing device. More particularly, the present invention relates to remote booting of a diskless computing device communicating through a pre-boot server address relay device to an address allocation server.

2. Discussion of the Related Art

Computer manufacturers have developed diskless computing devices that do not have a resident operating system in order to minimize the cost of network management. Network administration burden is minimized by centralizing copies of the operating system on a server and loading copies from the server onto the diskless computing devices. Diskless computing devices are able to operate as fully capable computers utilizing Windows 98, for example, as their operating system, by utilizing a pre-booting protocol. The pre-booting protocol is utilized to identify boot servers that allow the diskless computing devices to load the operating system from the boot servers. The diskless computing device downloads a boot image of the operating system and executes the boot image by loading the boot image in the diskless computing device's random access memory (RAM). An illustrative pre-booting protocol is the pre-boot execution ("pre-execution") environment (PXE) protocol (PXE Specification, Version 2.1, Sep. 20, 1999, Intel). Before the diskless computing device can request the list of boot servers, it needs to obtain a network address to allow it to communicate on a network. The diskless computing device may use an address allocation protocol, such as dynamic host configuration protocol (DHCP) (DHCP, RFC 2131, March 1997, Internet Engineering Task Force), to obtain the network address.

FIG. 1 illustrates an operation of a pre-booting protocol and an address allocation protocol according to the prior art. The diskless computing device broadcasts a discovery request utilizing the address allocation protocol and includes an identifier that it is using the pre-booting protocol. An address allocation server responds, using the address allocation protocol, that it has a network address. The diskless computing device receives the packets identifying the network address and transmits a request to be assigned the network address to the address allocation server. The address allocation server responds by acknowledging the diskless computing device's request. Included in each communication are identifiers indicating that the pre-booting protocol is active. Once the network address is received, the diskless computing device then attempts to obtain the boot image utilizing the pre-boot protocol. The diskless computing device attempts to obtain a list of the available boot images by communicating with the network address indicated in the packets as the source of the packets.

If a pre-booting server is on the same computing device as the address allocation server, the pre-booting server adds indicators to the packets sent by the address allocation server identifying that the remote pre-booting protocol is active. If the pre-booting server is not on the same device as the address allocation server but both are on the same network, the pre-booting server is configured with a proxy address allocation scheme and sends "empty" address allocation protocol compliant packets. The "empty" packets contain indicators that the pre-booting protocol is active, but have no source Internet Protocol addresses. The pre-booting server knows to send "empty" packets by listening on a port for address allocation protocol messages.

If the pre-booting server is on the same machine as the address allocation server, but both are on a different network from the diskless computing device, then an address allocation relay device relays communications between the pre-booting/address allocation server and the diskless computing device. In this configuration, the pre-booting/address allocation server sends packets with indicators that the remote pre-booting protocol is active. In some cases, the networks may be separated by a communications network, e.g., the Internet.

If the pre-booting server is on a different machine than the address allocation server and both are on a different network from the diskless computing device, then the address allocation relay device may also be used to pass address allocation messages. In this configuration, the pre-booting server is configured with a proxy address allocation scheme and sends "empty" packets compliant with the address allocation protocol. The "empty" packets may contain indicators that the pre-booting protocol is active, but do not contain source IP addresses.

A problem arises, however, if the address allocation relay device and the pre-booting server are located on the same computing device. If a pre-booting server is also acting as the relay agent for the address allocation server, it currently cannot add remote booting indicators to the packets nor can it send "empty" packets with remote booting protocol indicators. Thus, the packets still have the address allocation server's network address as the packets' source network address. The diskless computing device will attempt to initiate the remote pre-booting protocol by communicating with the source of the packets, which is the address allocation server. The address allocation server has no boot image information and thus never responds. Consequently, the diskless computing device may not be able to obtain boot image information.

Accordingly, a need exists to allow a diskless computing device to be able to remotely boot even when one device is acting as both a pre-booting server and an address relay device.

DETAILED DESCRIPTION

Figure 1:
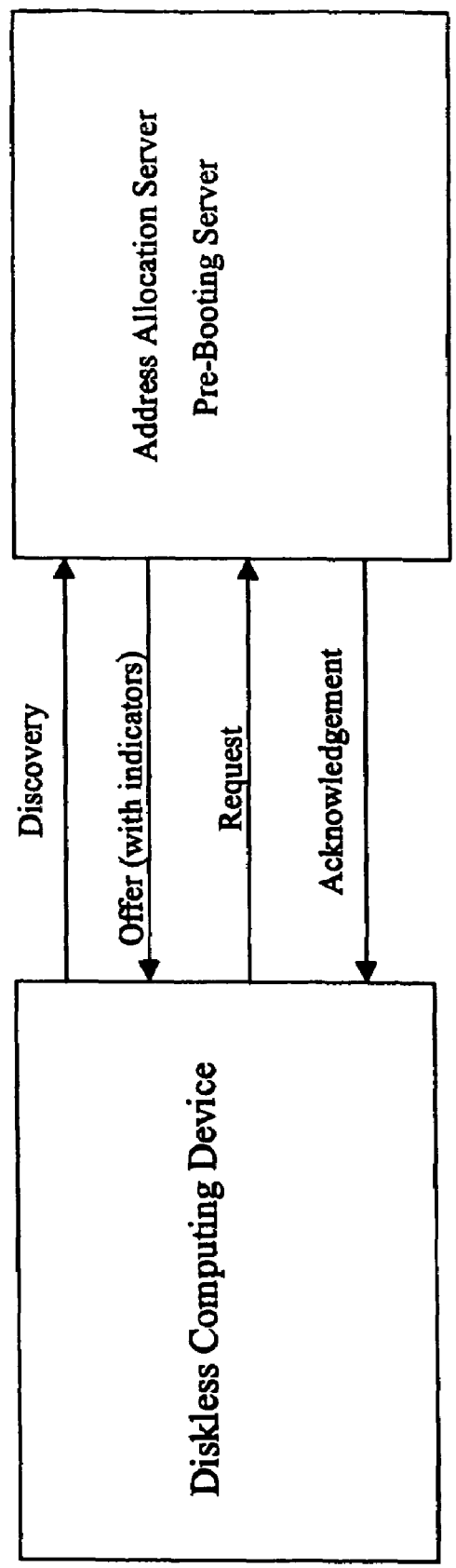
FIG. 1 illustrates an operation of a remote pre-booting protocol and an address allocation protocol according to the prior art.
Figure 2:
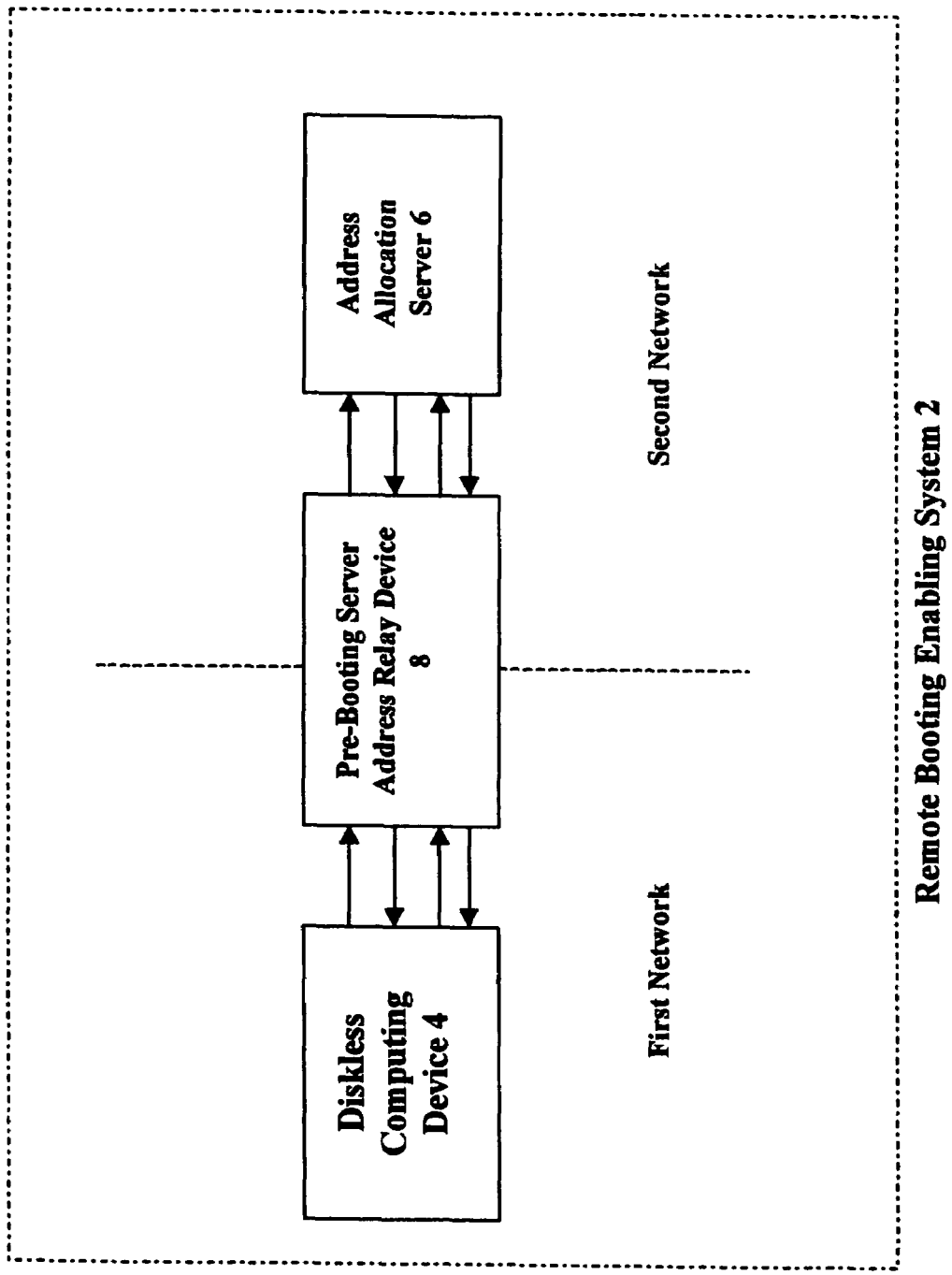
FIG. 2 illustrates a remote booting enabling system according to an embodiment of the present invention.

FIG. 2 illustrates a remote booting enabling system according to an embodiment of the present invention. The remote booting enabling system 2 includes a diskless computing device 4, an address allocation server 6, and a pre-booting server address relay device 8. The diskless computing device 4 may be located on a first network, the address allocation server 6 may be located on a second network, and the pre-booting server address relay device 8 may pass communication between the first network and the second network. The pre-booting server address relay device 8 may have the functionality to act both as a pre-booting server and an address allocation relay device. The communication including the diskless computing device 4, the address allocation server 6, and the pre-booting server address relay device 8 may be in the form of packets. Communication between the first network and the second network may occur over a communications network, such as an Internet.

The diskless computing device 4, upon booting, transmits packets for discovering an available network address, utilizing an address allocation protocol, to the pre-booting server address relay agent 8. The packets may indicate that a remote pre-booting protocol is also activated. The pre-booting server address relay device 8 may forward the packets to the address allocation server 6. The address allocation server 6 may receive the packets for discovering the available network address. In response, the address allocation server 6 may transmit offer packets identifying that a network address is available. In embodiments of the present invention, multiple address allocation servers 6 may transmit offer packets identifying that a network address is available. The offer packets may be received by the pre-booting server address relay device 8.

The pre-booting server address relay device 8 may modify the offer packets and output modified packets. The packets may be modified in two ways. First, the pre-booting server address relay device 8 may add indicators to the packets identifying that the pre-booting protocol is activated. Second, the pre-booting server address relay device 8 may change the source network address of the packet, which previously was an address allocation server network address, to the pre-booting server address relay device network address. The diskless computing device 4 utilizes the source network address to know which machine to connect to begin the process of downloading a boot image. If offer packets from multiple address allocation servers 6 are received by the pre-booting server address relay device 8, the pre-booting server address relay device 8 may modify all of the offer packets and output modified packets from the multiple address allocation servers 6.

The modified packets may be transmitted to the diskless computing device 4. The diskless computing device 4 may receive the modified packets indicating the network address offer and transmit request packets for a network address request utilizing the address allocation protocol. In embodiments of the present invention where modified packets are received from multiple address allocation servers 6, the diskless computing device 4 may select one of the address allocation servers 6 to communicate with and transmit request packets which are designated for the selected address allocation server 6 to the pre-booting server address relay device 8. The pre-booting server address relay device 8 may receive the request packets for a network address request and forward the request packets to the address allocation server 6. The address allocation server 6 may transmit acknowledgement packets acknowledging the network address that the diskless computing device 4 has been allocated to the pre-booting server address relay device 8. The pre-booting server address relay device 8 may receive the acknowledgment packets identifying the network address to be utilized by the diskless computing device 4 and may output modified acknowledgement packets identifying the network address to be utilized by the diskless computing device 4. The modified acknowledgment packets are modified as discussed above, where indicators are added to identify whether the pre-booting protocol has been activated, and where the source network address of the modified acknowledgement packets has been changed to the pre-booting server address relay device network address. The modified acknowledgement packets identifying the network address to be utilized by the diskless computing device 4 are transmitted to the diskless computing device 4. The address allocation protocol is complete and the remote booting protocol is initiated. The diskless computing device 4 begins communication with a device that has the network address indicated in the modified acknowledgement packet. Because the pre-booting server address relay device 8 has the network address contained in the modified packets, the diskless computing device 4 may initiate the pre-booting protocol with the pre-booting server address relay device 8. After the protocol is complete, the diskless computing device 4 has an operating system loaded in its RAM and may function as a device in, for example, a Windows environment.

Figure 3:
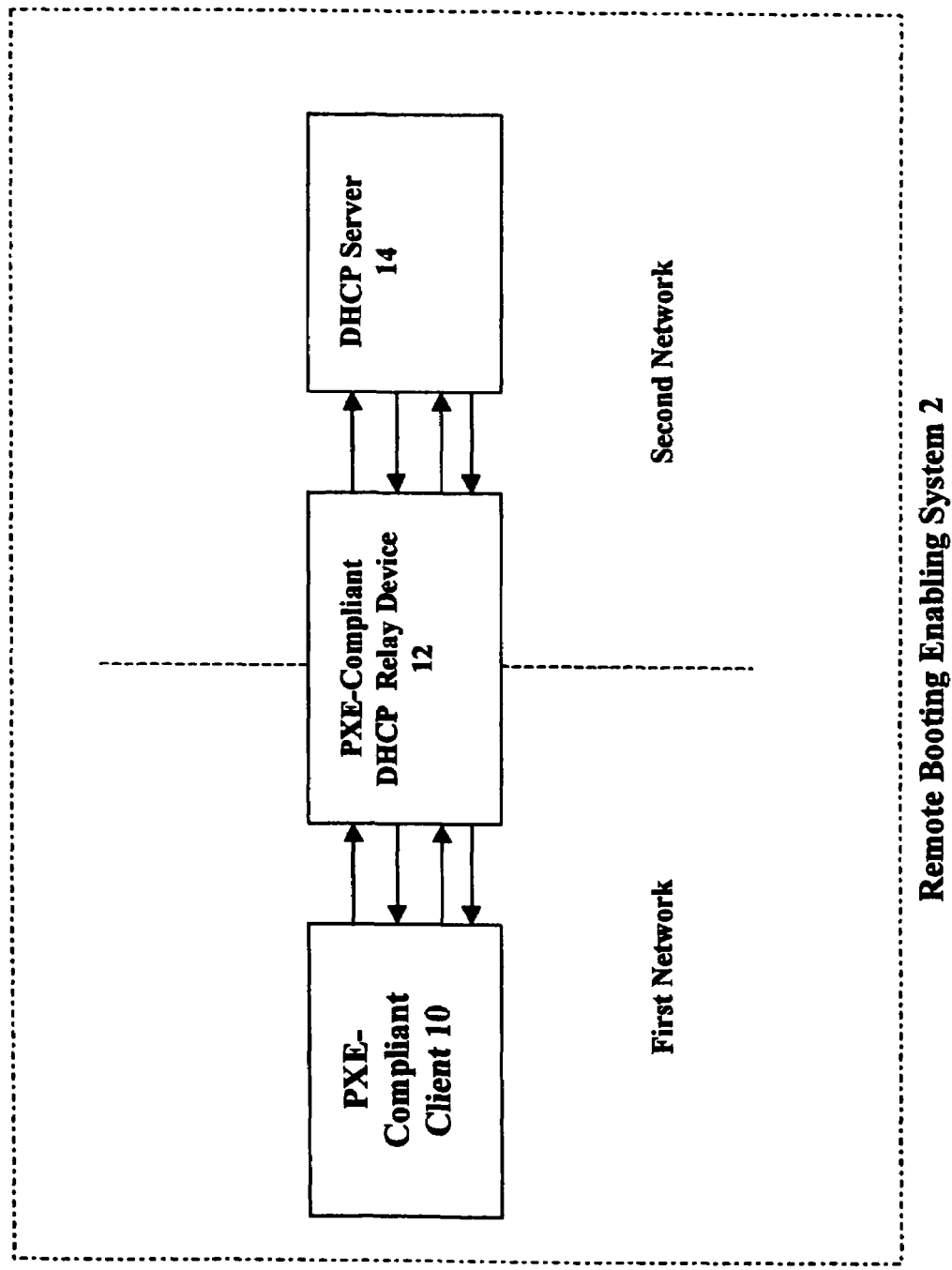
FIG. 3 illustrates an embodiment of the present invention wherein the remote pre-booting protocol is a pre-boot execution environment (PXE) protocol and the address allocation protocol is a dynamic host configuration protocol (DHCP)

FIG. 3 illustrates an embodiment of the present invention wherein the pre-booting protocol is a pre-boot execution environment (PXE) protocol and the address allocation protocol is a dynamic host configuration protocol (DHCP). The pre-boot execution environment protocol may also be referred to as a pre-execution environment protocol. The remote boot enabling system 2 may include a PXE-enabled client 10, a PXE-compliant DHCP relay device 12, and a DHCP server 14. The PXE-enabled client 10 may be on a first network with at least one computing device. The DHCP server 14 may be on a second network. The PXE-compliant DHCP relay device 12 may pass communications between the PXE-enabled client 10 and the DHCP server 14 as discussed previously. The first network and the second network may be separated by a communications network, such as the Internet.

Figure 4:
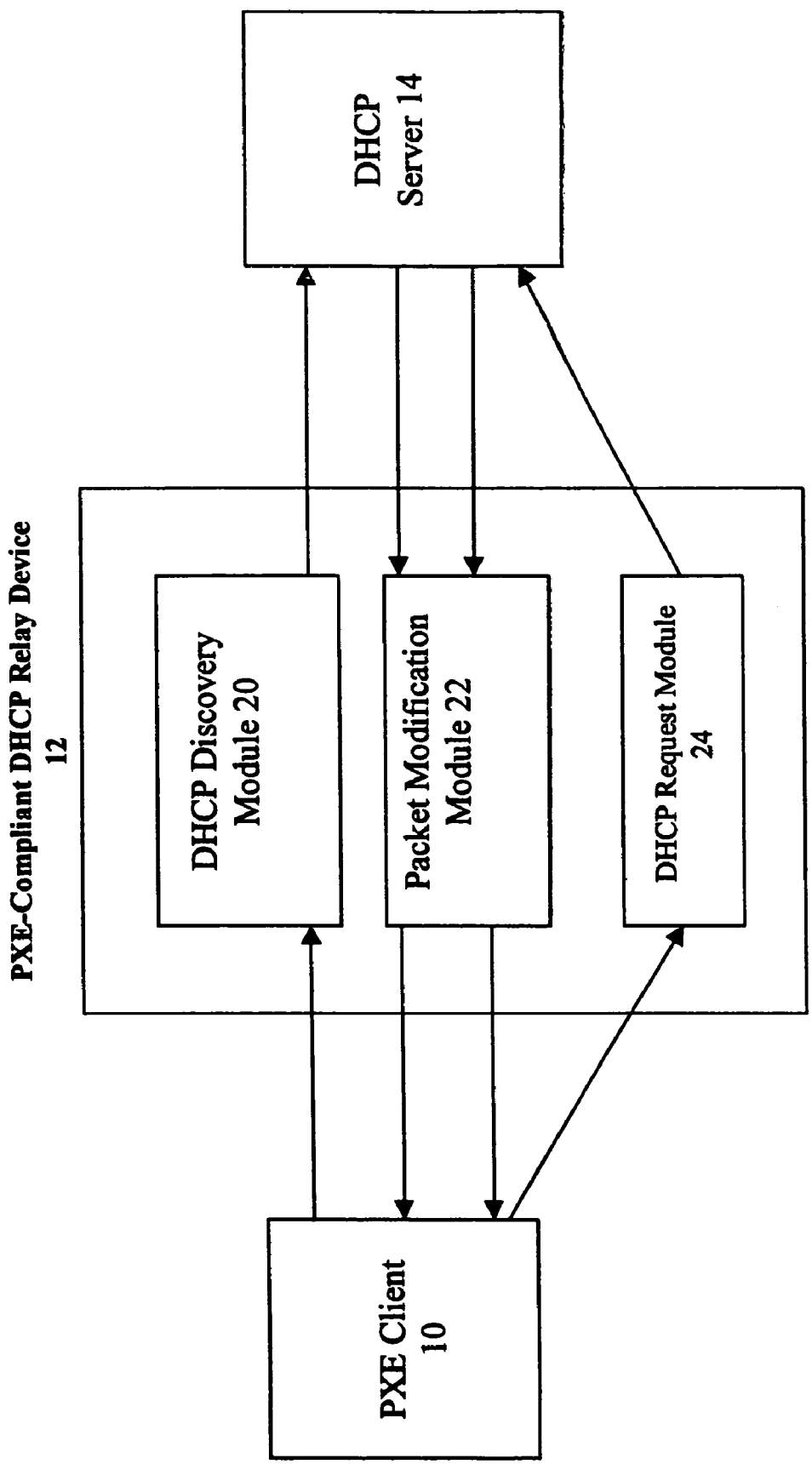
FIG. 4 illustrates a PXE-compliant DHCP relay device according to an embodiment of the present invention.

FIG. 4 illustrates a PXE-compliant DHCP relay device 12 according to an embodiment of the present invention. The PXE-compliant DHCP relay device 12 may include a DHCP discovery module 20, a packet modification module 22, and a DHCP request module 24.

The DHCP discovery module 20 may process a data request, which may be in the form of packets, from a PXE-enabled client 10 that includes an indicator of the PXE protocol in the packets and may relay the packets to the DHCP server 14. The indicator of the PXE protocol may be located in an options field of a user datagram protocol (UDP) packet, which is a packet transport protocol utilized by the DHCP protocol. In this step, the DHCP discovery module 20 is attempting to determine the available network addresses for network connection. The DHCP server 14 may send offer packets, identifying a network address that is intended for the PXE-enabled client 10. In one embodiment of the present invention, the DHCP server 14 may normally hold the network address for the PXE-enabled client 10 for a specified period of time.

The packet modification module 22 may receive the offer packets from the DHCP server 14, indicating the network address available for the PXE-enabled client 10. The packet modification module 22 may "masquerade" as the DHCP server 14 by replacing a source network address of the offer packets, which originally was a DHCP server network address, with a PXE-compliant DHCP relay agent network address. Thus, the offer packets now have the network address of the PXE-compliant DHCP relay agent 12. The packet modification module 22 performs this "masquerade" because the PXE-enabled client 10 initiates the pre-boot execution protocol with the device whose source network address is located in any of the packets it receives. The packet modification module 22 may also add PXE tags into the options field of the offer packets sent from the DHCP server 14. After the packets have the PXE tags inserted into the options field, the offer packets may be referred to as the modified offer packets and are transmitted to the PXE-enabled client 10. The PXE-enabled client 10 receives the modified offer packets relayed from the PXE-compliant DHCP relay device 12.

The PXE-enabled client 10 may request the network address, e.g., generate a DHCP request in the form of packets, and transmit the request packets to the PXE-compliant DHCP relay device 12. The DHCP request module 24 may accept the request packets and output the request packets to the DHCP server 14. In other words, after the PXE-enabled client 10 has received the offer packet indicating an offer of the network address, the DHCP request module 24 is now relaying to the DHCP server 14 that the PXE-enabled client 10 would like to use the network address. The DHCP server 14 may receive the request packets from the DHCP request module 24 and send an acknowledgement, in the form of acknowledgement packets, along with other configuration parameters, to the PXE-compliant DHCP relay device 12.

The packet modification module 22 may receive the acknowledgement packets and again "masquerade" as the DHCP server 14. The packet modification module 22 replaces the source network address (previously the network address of the DHCP server 14) in the acknowledgement packets with the network address of the PXE-compliant DHCP relay device 12. In addition, the packet modification module 22 may add PXE tags into the options field of the acknowledgement packets. After these two operations, the packets may be referred to as modified acknowledgement packets. The modified acknowledgement packets may be transmitted to the PXE-enabled client 10.

The PXE-enabled client 10 may receive the modified acknowledgement packets, which have the source network address of the PXE-compliant DHCP relay device 12. The PXE-enabled client 10 may initiate communications utilizing the PXE protocol with the device identified in the source network address of the modified acknowledgement packets. If the client tried to initiate communications with the DHCP server 14, pre-boot execution could not occur because the DHCP server 14 does not have access to boot images. Instead, the PXE-enabled client 10 may attempt to initiate a PXE session with the PXE-compliant DHCP relay device 12, which does have access to a list of boot servers and the ability to download boot images through a file transfer protocol (FTP), such as multicast trivial file transfer protocol (MT-FTP). Thus, the PXE-enabled client 10 may be able to load the necessary operating system files into memory to allow the booting of the computer.

Figure 5:
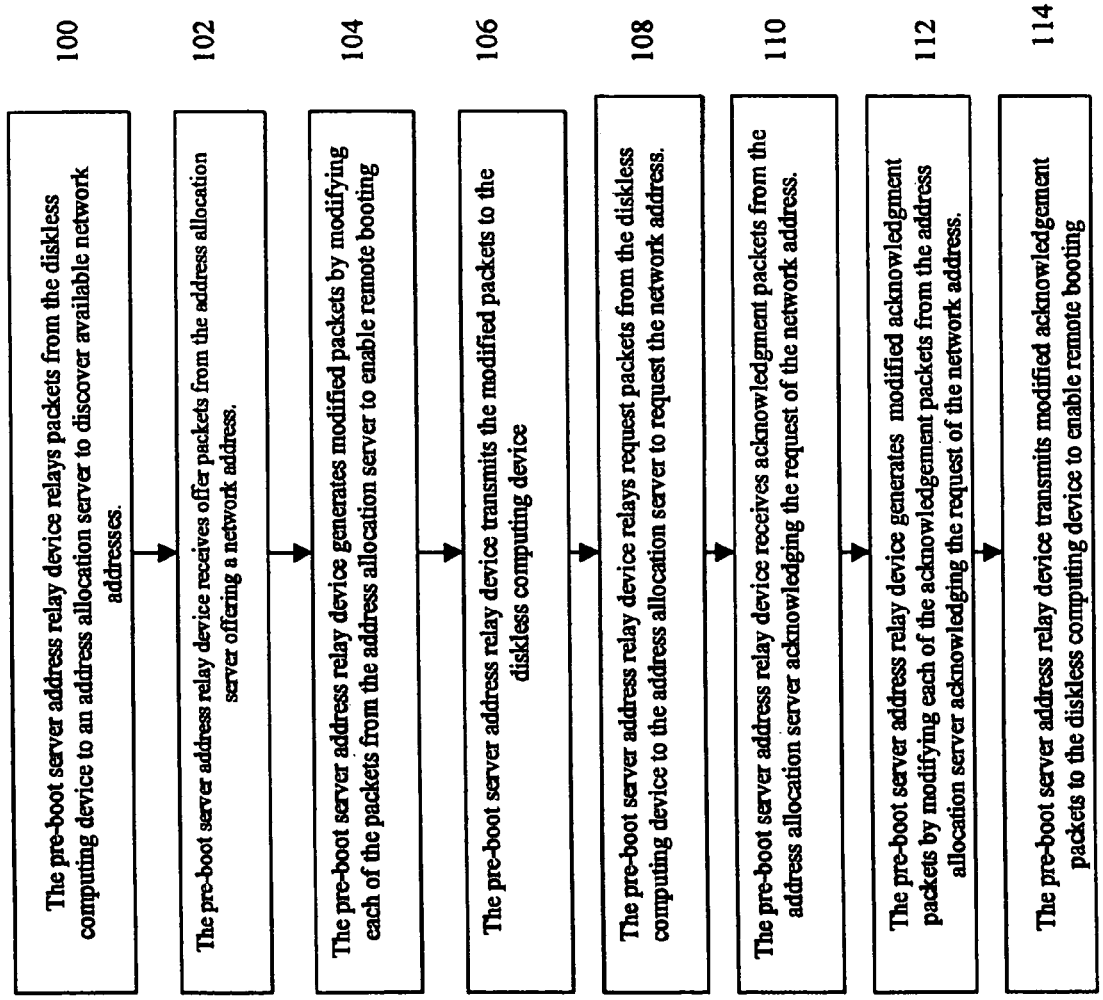
FIG. 5 illustrates a data flow diagram of the remote booting enabling system according to an embodiment of the present invention.

FIG. 5 illustrates a data flow diagram of the remote booting enabling system according to an embodiment of the present invention. The pre-boot server address relay device 8 relays 100 packets from the diskless computing device 10 to an address allocation server 6 to discover available network addresses. The pre-boot server address relay device 8 receives 102 offer packets from the address allocation server 6 offering a network address. The pre-boot server address relay device 8 generates 104 modified packets by modifying each of the packets from the address allocation server to enable remote booting. The pre-boot server address relay device 8 transmits 106 the modified packets to the diskless computing device 4. The pre-boot server address relay device 8 relays 108 request packets from the diskless computing device 4 to the address allocation server 6 to request the network address. The pre-boot server address relay device 8 receives 110 acknowledgement packets from the address allocation server acknowledging the request of the network address. The pre-boot server address relay device 8 generates 112 modified acknowledgment packets by modifying each of the acknowledgment packets from the address allocation server 6 acknowledging the request of the network address. The pre-boot server address relay device 8 transmits 114 the modified acknowledgement packets to the diskless computing device to enable remote booting.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are intended to be embraced therein.

What is claimed is:

1. A method to initiate remote booting of a diskless computing device utilizing a pre-booting server address relay agent, comprising:
    relaying packets from the diskless computing device to an address allocation server to discover available network addresses;
    receiving offer packets from the address allocation server offering a network address;
    generating modified packets by modifying each of the offer packets received from the address allocation server, the modifying including replacing the network address of the address allocation server with a network address of the pre-booting server address relay agent in a source address field of the modified packets; and
    transmitting the modified packets to the diskless computing device to offer the diskless computing device the network address.

2. The method of claim 1, wherein the modified packets are further modified by adding an indicator of remote booting into a field of the modified packets.

3. The method of claim 1, wherein the address allocation server is a dynamic host configuration parameter (DHCP) server, the diskless computing device is a PXE-enabled client, and the pre-booting server address relay device is a PXE-compliant DHCP relay device.

4. The method of claim 3, wherein the modified packets are modified by replacing a DHCP server network address with a PXE-compliant DHCP relay device network address in a source network address field of the modified packets.

5. The method of claim 4, wherein the modified packets are further modified by adding an indicator of remote booting into a field of the modified packets.

6. The method of claim 1, further including receiving a plurality of offer packets from additional address allocation servers other than the address allocation servers and generating additional modified packets by modifying each of the offer packets from the additional address allocation servers to include the pre-boot network address for the relay agent in the source network address field.

7. The method of claim 6, further including transmitting the additional modified packets to the diskless computing device in addition to the transmission of the modified packets.

8. The method of claim 7, wherein the diskless computing device selects one of the modified packets from the address allocation server or the offer packets for each of the additional address allocation servers as the network address.

9. The method of claim 1, wherein the modification of the offer packets allow the diskless computing device to know which device to communicate with to obtain a boot image.

10. A program code storage device, comprising:
   a computer-readable storage medium; and
   computer-readable program code, stored on the computer-readable storage medium, having instructions, which when executed cause a computing device to:
   relay packets from a diskless computing device to an address allocation server to discover available network addresses;
   receive offer packets from the address allocation server offering a network address;
   generate modified packets by modifying each of the offer packets received from the address allocation server, the modifying including replacing the network address of the address allocation server with a network address of the pre-booting server address relay agent in a source address field of the modified packets; and
   transmit the modified packets to the diskless computing device to offer the diskless computing device the network address.

11. The program code storage device of claim 10, wherein the modified packets are further modified by adding an indicator of remote booting into a field of the modified packets.

12. The program code storage device of claim 10, including instructions, which when executed cause the computing device to receive a plurality of offer packets from additional address allocation servers other than the address allocation servers and generate additional modified packets by modifying each of the offer packets from the additional address allocation servers to include the pre-boot network address for the relay agent in the source network address field.

13. The program code storage device of claim 12, including instructions, which when executed, cause the computing device to transmit the additional modified packets to the diskless computing device in addition to the transmission of the modified packets.

14. The method of claim 13, wherein the diskless computing device selects one of the modified packets from the address allocation server or the offer packets for each of the additional address allocation servers as the network address.

15. A pre-boot execution environment (PXE)-compliant dynamic host configuration protocol (DHCP) relay device, comprising:
   a DHCP discovery module to relay packets from a diskless computing device to a DHCP server to discover an available Internet Protocol (IP) address; and
   a packet modification module to modify offer packets sent from the DHCP server to offer an IP address by placing a PXE-compliant DHCP relay device's IP address in a source IP address field of the offer packets and to transfer the modified offer packets to the diskless computing device.

16. The PXE-compliant DHCP relay device of claim 15, the packet modification modules further including PXE tags into a field of the offer packets.

17. The PXE-compliant DHCP relay device of claim 15, further including a DHCP request module to relay request packets from the diskless computing device to the DHCP server to request the IP address that was offered by the DHCP server, wherein the packet modification modules modifies acknowledgement packets sent from the DHCP server acknowledging the IP address by placing the PXE-compliant DHCP relay device's IP address in a source IP address field of the acknowledgement packets to replace the DHCP server's IP address.

18. The PXE-complaint DHCP relay device of claim 17, further including the packet modification module adding PXE tags into a field of the acknowledgement packets.

* * * * *